United States Patent
Laurencio Molino et al.

(10) Patent No.: US 10,801,752 B1
(45) Date of Patent: Oct. 13, 2020

(54) TANKLESS WATER HEATER FOR A RECREATIONAL VEHICLE

(71) Applicants: Juan Carlos Laurencio Molino, Desamparados (CR); Gustavo Esquivel, Pace, FL (US)

(72) Inventors: Juan Carlos Laurencio Molino, Desamparados (CR); Gustavo Esquivel, Pace, FL (US)

( * ) Notice: Subject to any disclaimer, the term of this patent is extended or adjusted under 35 U.S.C. 154(b) by 222 days.

(21) Appl. No.: 16/136,361

(22) Filed: Sep. 20, 2018

(51) Int. Cl.
*H05B 1/02* (2006.01)
*F24H 9/20* (2006.01)
*F24H 1/10* (2006.01)
*F24H 9/18* (2006.01)
*F24H 1/00* (2006.01)

(52) U.S. Cl.
CPC ......... *F24H 9/2028* (2013.01); *F24H 1/0018* (2013.01); *F24H 1/101* (2013.01); *F24H 9/1818* (2013.01)

(58) Field of Classification Search
CPC ...... F24H 9/2028; F24H 1/101; F24H 1/0018; F24H 9/1818; H05B 1/02; H05B 1/0244; H05H 1/0297; H05H 3/0071
USPC ........ 219/494, 497, 507; 392/308, 447, 465, 392/488, 449
See application file for complete search history.

(56) References Cited

U.S. PATENT DOCUMENTS

| | | | | |
|---|---|---|---|---|
| 2,190,303 A | * | 2/1940 | Wantz | H05B 1/02 335/181 |
| 3,694,663 A | * | 9/1972 | Pinckaers | G05D 23/1909 307/116 |
| 4,550,689 A | * | 11/1985 | Wolter | F24H 1/165 122/14.21 |
| 8,276,548 B2 | * | 10/2012 | Consadori | F24H 9/2035 122/18.1 |
| 2005/0274329 A1 | * | 12/2005 | Brewster | F24D 1/005 122/36 |

* cited by examiner

*Primary Examiner* — Mark H Paschall
(74) *Attorney, Agent, or Firm* — Peter Loffler

(57) ABSTRACT

A tankless water heater for use in a recreational vehicle uses one or more water chambers, each with a heating element, through which cold water flows and is heated. The system is connected to the alternating current of the recreational vehicle and controls the water temperature by sending the current through one or more TRIACs that change the firing angle of the current in order to increase or decrease power flow to the heating elements depending on the sensed temperature of the outflowing water that is compared against the selected temperature or to match the amount of power flow desired to be sent to the heating elements. The user selects whether to control the unit via a temperature selection or an amount of power flow selection.

9 Claims, 4 Drawing Sheets

TANKLESS WATER HEATER FOR A RECREATIONAL VEHICLE

BACKGROUND OF THE INVENTION

1. Field of the Invention

The present invention relates to a variable control tankless water heating system installed within a recreational vehicle and that produces hot water on demand without the need to deploy a conventional hot water tank.

2. Background of the Prior Art

Many enjoy the freedom of a recreational vehicle (RV). Load the RV with clothing, food, supplies, etc., and take to the open road. Drive to a selected destination or simply to wherever the mood dictates, find an RV park, stop and enjoy. No need to find an expensive hotel, to unpack, or to find a restaurant to eat at. The RV is a home away from home where most of the creature comforts of home can be undertaken including sleeping, cooking and eating, watching television or surfing the Internet, using the facilities including showering, etc., as RVs tend to have sleeping quarters, a shower, a stove, a refrigerator, communications equipment including a satellite dish, etc. An RV is great fun and a great way to see the country.

RVs are limited in size as they must be able to safely and properly travel down the country's highways and byways. As such, their limited size puts real estate within an RV at a premium, especially considering that RV owners want maximum functionality from their vehicle. Accordingly, RV designers are constantly striving to maximize this functionality within the very limited space available. One item that most RVs have on board is a water heater to produce hot water for showering as well as to wash dishes. The water heater, while necessary, takes up a fair amount of the valuable real estate within the RV and adds a fair amount of weight to the overall vehicle. Additionally, the water heater consumes a fair bit of electricity in the heating and temperature maintenance of the water within the tank. All in all, the water heater is a relatively "expensive" yet necessary part of the RV.

What is needed is a device that replaces the conventional tank-based water heater within an RV. Such a device must heat the water to a comfortable temperature in order to allow showering, dish washing, etc., yet reduce the real estate foot print and weight addition generated by the standard water heater typically found in an RV. Such a device must be easy to operate and should be an electricity consumption miser.

SUMMARY OF THE INVENTION

The tankless water heater for a recreational vehicle of the present invention addresses the aforementioned needs in the art by providing a device that rapidly heats water on demand without the need for a conventional hot water tank. The tankless water heater for a recreational vehicle is relatively small and lightweight compared to a hot water tank system so that the device reduces the water heating system footprint and weight within the RV. The tankless water heater for a recreational vehicle uses electricity only when hot water is demanded by a user so that the device does not have to heat and reheat the water within its tank, making the tankless water heater for a recreational vehicle an electricity usage miser. The tankless water heater for a recreational vehicle is of relatively simple design and construction, being produced using standard manufacturing techniques, thereby making the device economically attractive to RV manufacturers as well as RV owners considering a retrofit. Use of the tankless water heater for a recreational vehicle is simple and straightforward.

The tankless water heater for a recreational vehicle of the present invention is comprised of a tank that has an inlet line with an inlet port that is connected to a source of water. The tank also has an outlet line with an outlet port. The outlet line has a heat sensor disposed therein for sensing a water temperature of the water flowing therethrough. A heating element has a thermostat which is connected to a source of alternating current such that the alternating current passes through a three-terminal semiconductor device (TRIAC) that adjusts the firing angle of the alternating current passing therethrough in order to control an amount of power (percentage of maximum power flow available) of the alternating current flowing to the thermostat. The heating element is disposed within the tank. A control panel is in signal communication with the temperature sensor and the TRIAC such that the control panel has a temperature value setting corresponding to a desired temperature and a power value setting corresponding to a percentage of desired power amount. The control panel also has a toggle switch for selecting either the temperature value or the power value so that if the temperature value is selected, the control panel receives the water temperature sensed by the heat sensor and compares the water temperature to the desired temperature and if the two are not equal, the control panel sends a signal to the TRIAC to either increase the amount of power flowing to the thermostat if the water temperature is below the desired temperature, or to decrease the amount of power flowing to the thermostat if the water temperature is above the desired temperature and if the power value is selected, the control panel sends a signal to the TRIAC to adjust the amount of power flowing to the thermostat to match the power value. The temperature value and the power value are each adjustable. An on/off switch is located along a path of the alternating current for turning the flow of the alternating current between the alternating current source and the thermostat on or off. The on/off switch is a flow meter that senses a fluid flow rate. The flow meter is disposed within the inlet line such that the on/off switch is off unless the fluid flow rate sensed by the flow meter exceeds a threshold value. A circuit breaker is located along a path of the alternating current for interrupting the flow of the alternating current between the alternating current source and the thermostat. The circuit breaker is connected to the control panel such that if the water temperature sensed by the heat sensor exceeds a threshold value, the circuit breaker trips and interrupts the flow of alternating current to the thermostat. The circuit breaker has a manual trip button for tripping the circuit breaker.

DESCRIPTION OF THE PREFERRED EMBODIMENT

Figure 1:
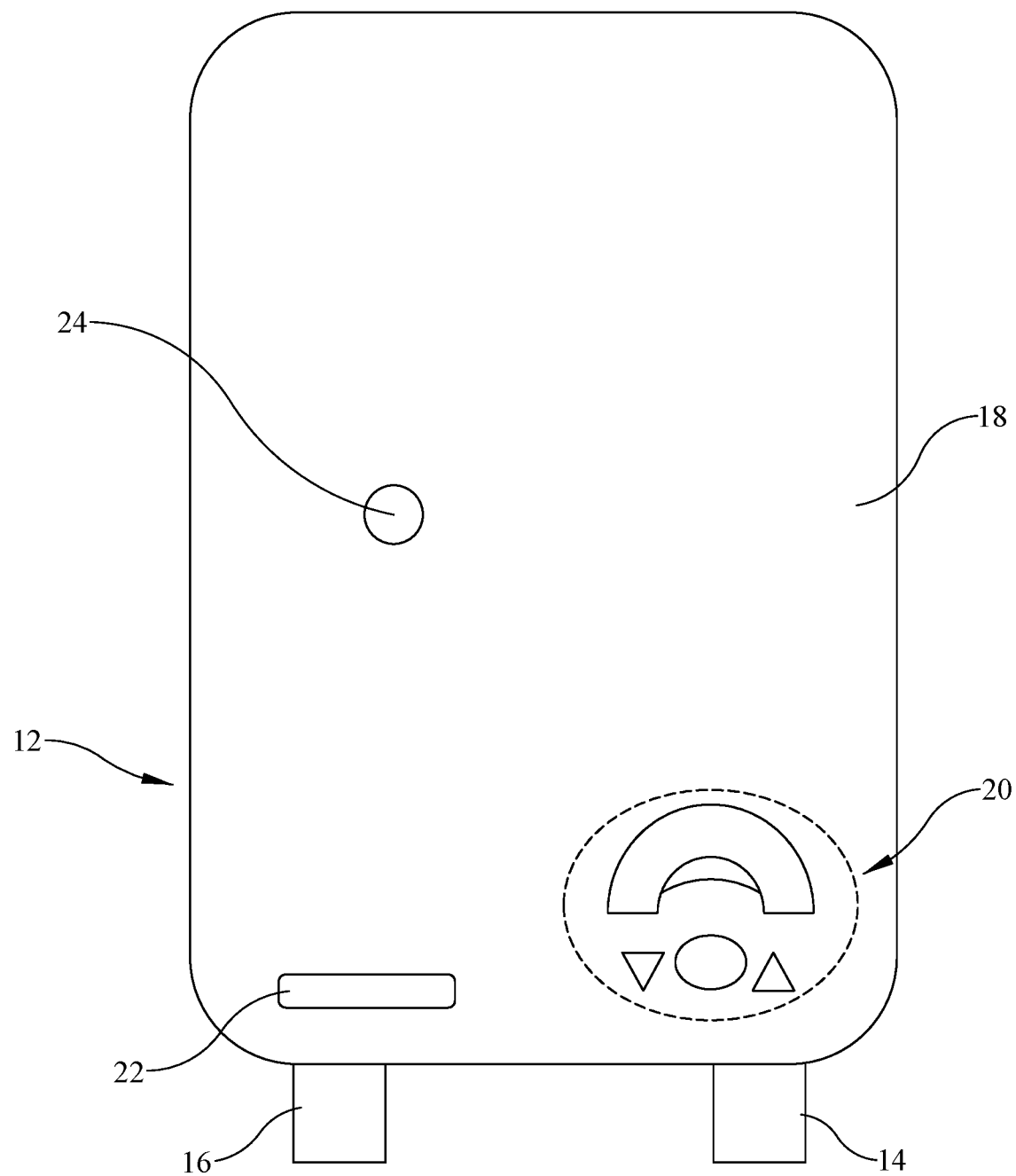
FIG. 1 is a front view of the overall tankless water heater for a recreational vehicle of the present invention.

Referring now to the drawings, it is seen that the tankless water heater for a recreational vehicle of the present invention, generally denoted by reference numeral 10, is comprised of an overall housing 12 wherein the physical, electrical and electronic components of the tankless water heater for a recreational vehicle 10 are housed.

As seen in FIG. 1, the housing 12 has an inlet port 14 for receiving a cold water supply line (not illustrated) therethrough from the water storage tank (not illustrated) of the recreational vehicle and an outlet port 16 where the hot water return line (not illustrated), carrying water heated by the tankless water heater for a recreational vehicle 10 that flows to whereat the hot water is demanded, passes. Located on the front cover 18 of the housing is a control panel 20 as more fully discussed below, a view window 22 for visual inspection of the electric components of the tankless water heater for a recreational vehicle 10, and a reset button access opening 24 as more fully discussed below.

Figure 2:
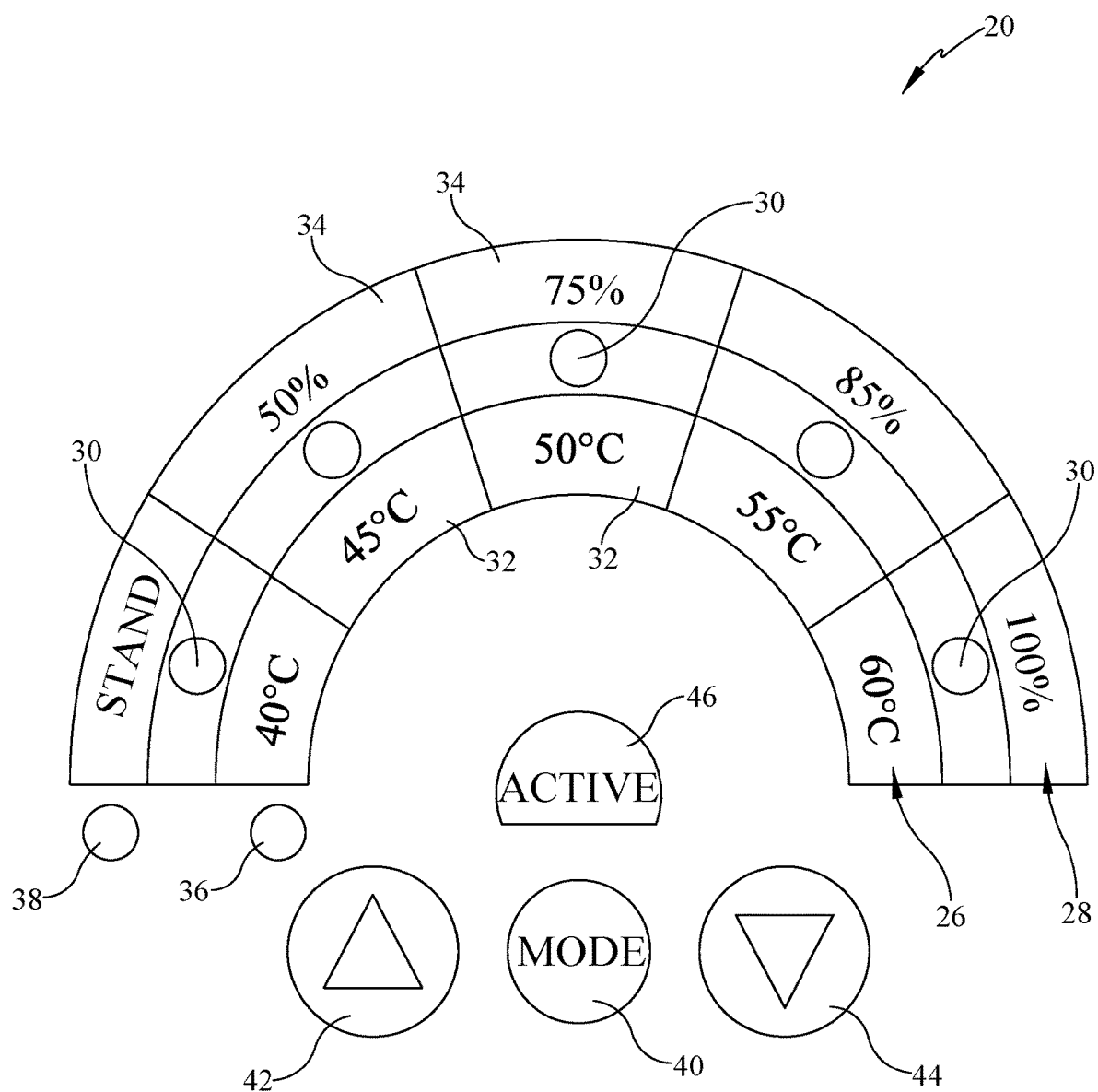
FIG. 2 is a close-up detail view of the control panel of the tankless water heater for a recreational vehicle.

As seen in FIG. 2, the control panel 20 has a range for both temperature 26 (temperature range) and electric power supplied 28 (power range) selectable by a user. Each step in the temperature range 26 and the power range 28 has an indicator light 30 associated with a particular temperature 32 and a particular amount of electric power supplied 34 that is associated with that particular temperature 32. The control panel 20 has a first light 36 so show that the temperature range 26 is selected and a second light 38 to show that the power range 28 is selected. A mode button 40 on the control panel 20 allows the user to toggle back and forth between temperature range 26 and power range 28 selection. An up button 42 and a down button 44 allows the user to select the desired temperature 32 or amount of electric power supplied 34 depending on whether temperature range 26 is selected the power range 28 is selected, respectively. An active light 46 shows whether or not the system is active. The various buttons may be illuminated.

Figure 3:
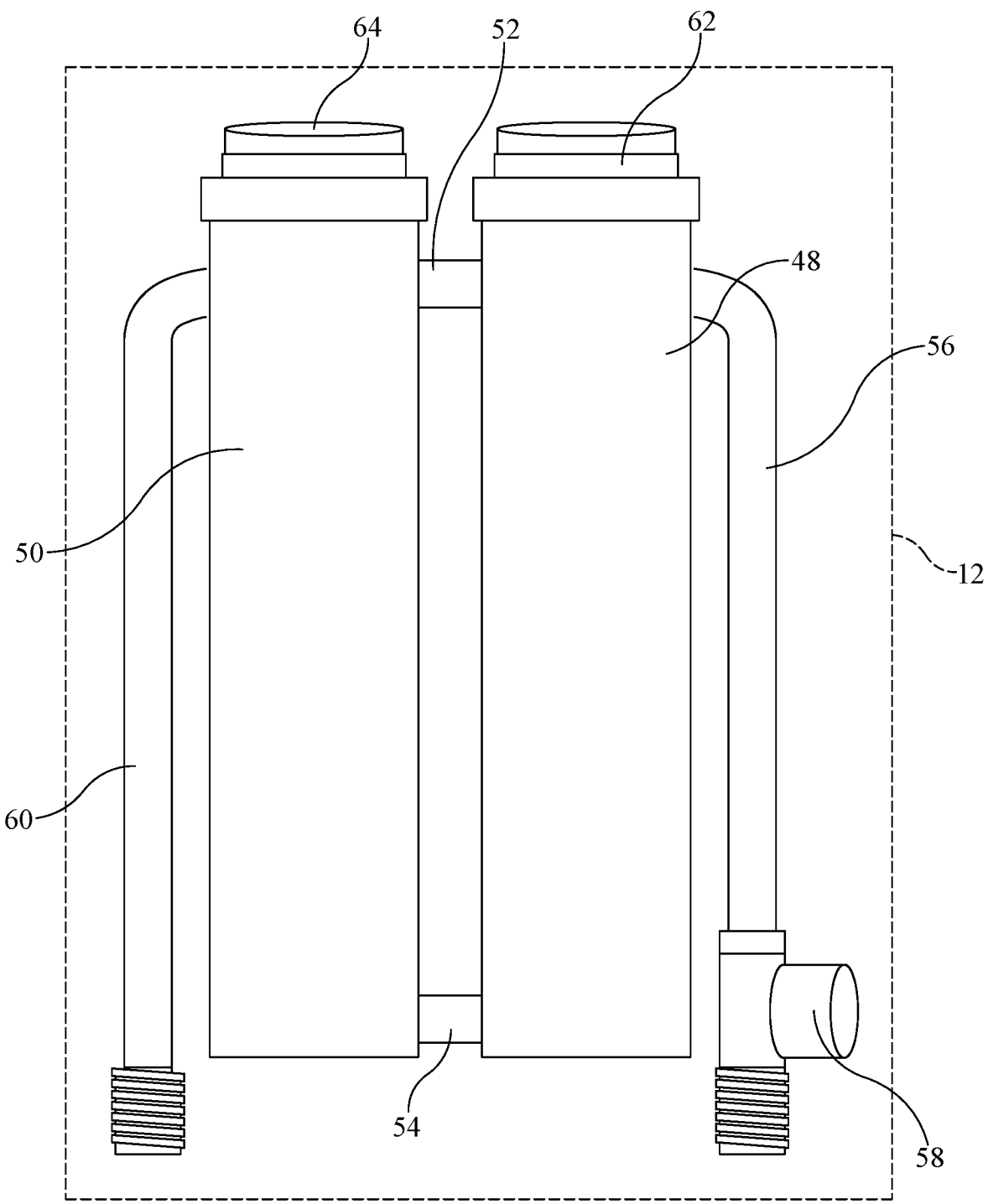
FIG. 3 is a front view of the housing of the tankless water heater for a recreational vehicle with the front cover removed, illustrating the major physical components of the invention.

As seen in FIG. 3, the main physical components of the tankless water heater for a recreational vehicle 10 comprises a first water chamber 48 and a second water chamber 50 that is fluid flow connected with the first water chamber 48 via an upper cross pipe 52 and a lower cross pipe 54. As seen, an inlet water line 56 is fluid flow connected to the first water chamber 48, the end of which is connected to the cold water supply line (not illustrated), in any appropriate manner such as by a threaded connection. Located along the inlet water line 56 is a water flow meter 58 of any appropriate design, for monitoring the water flow rate through the inlet water line 56. An outlet water line 60 is fluid flow connected to the second water chamber 50, the end of which is connected to the hot water water supply line (not illustrated), in any appropriate manner such as by a threaded connection. The water chambers 48 and 50 and the water lines 52 and, 56 are made from an appropriate material for holding and transporting hot and cold potable water, such as copper. A first water heating element 62 is disposed within the first water chamber 48 while a second water heating element 64 is disposed within the second water chamber 50. The heating elements 62 and 64 are of appropriate design so as to rapidly heat when supplied with electricity and are made from an appropriate material such as magnesium and nickel plated copper.

Figure 4:
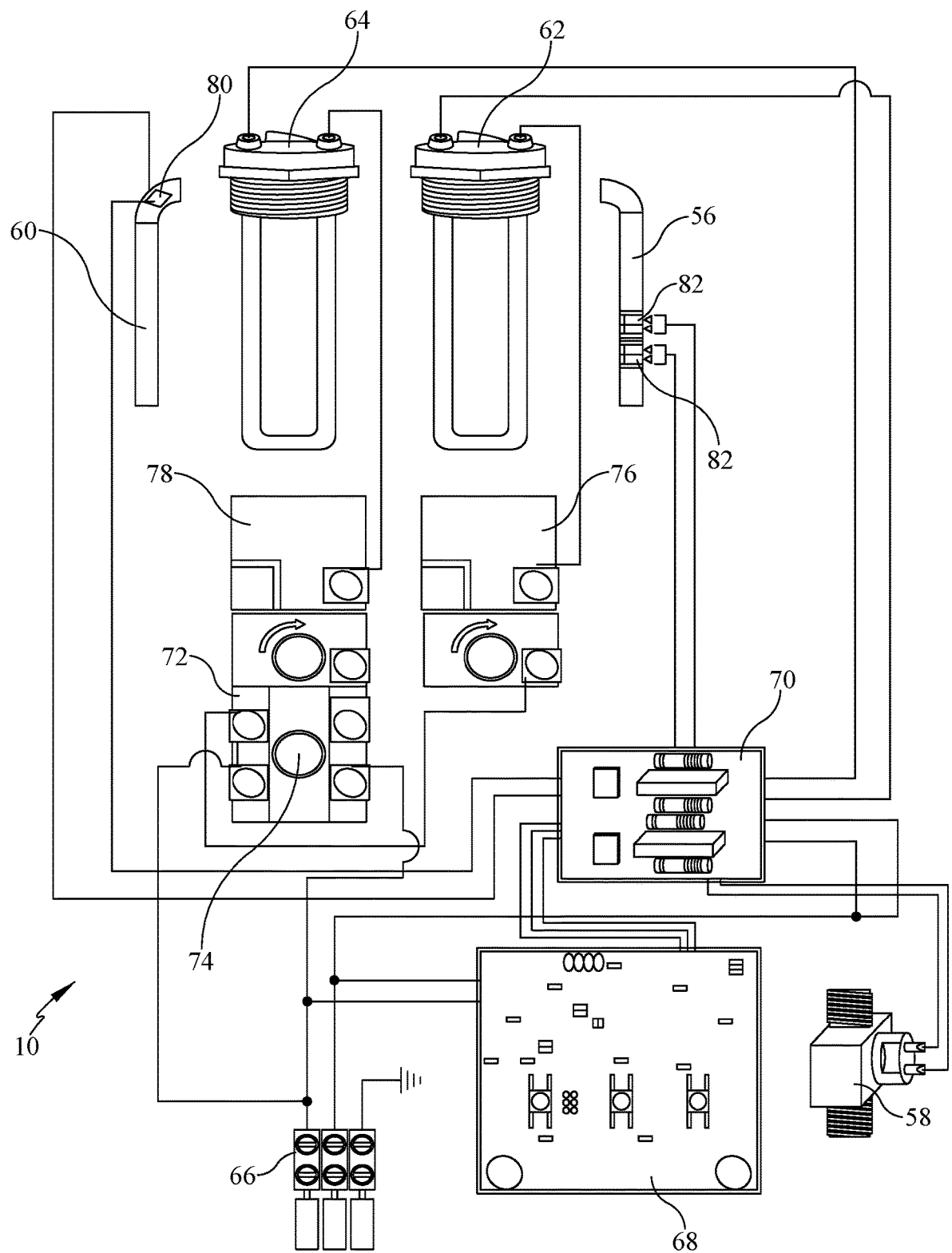
FIG. 4 is an electrical schematic of the tankless water heater for a recreational vehicle Similar reference numerals refer to similar parts throughout the several views of the drawings.

As best seen in FIG. 4, the electrical system is comprised of a grounded cable connection block 66 that is electrically connected to the electrical system (not illustrated) of the recreational vehicle and distributes the electric power to the electronic control card 68, to the power board 70, through the emergency shut off 72 which acts as a circuit breaker, and which also has a mechanical push reset button 74 to trip the circuit, and to the primary thermostat 76 and to the secondary thermostat 78, which are themselves connected to the first water heating element 62 and the second water heating element 64, respectively. The input power is alternating current (such as 110 VAC or 220 VAC, depending on the particular implementation). The electronic control block 68, contains the circuitry to make the tankless water heater for a recreational vehicle 10 function properly. The electronic control card 68 may use neural network or other appropriate protocols to achieve its intended purpose. The electronic control card 68 is electrically connected to the water flow meter 58 and to an output temperature sensor 80 located within the outlet water line 60, The power board 70 contains a step-down convertor that receives the alternating current from the control block 68 and converts the electric input into a low voltage direct current. The power board 70 is electrically connected to the water flow meter 58, to the control panel 20 (electrical connection not illustrated in FIG. 4), to the output temperature sensor 80 and to a pair of three-terminal semiconductor devices (TRIAC) 82 located within the inlet water line 54, properly sealed, in order to allow the water flowing through the inlet power line 54 to cool the TRIACs 82. The TRIACs 82 adjust the firing angle of the incoming alternating current from the power board 70 in order to control the amount of current flowing to the water heating elements 62 and 64.

In operation, the tankless water heater for a recreational vehicle 10 is installed in a recreational vehicle as appropriate, such as in the location whereat the typical hot water heater is normally installed, and the control panel 20 is installed at a desired location within the living quarters of the recreational vehicle and is electrically connected o the electronic control card 68. The cold water supply line of the recreational vehicle is connected to the inlet water line 54 in appropriate fashion and the hot water supply line is connected to the outlet water line 56 in appropriate fashion. The alternating current electrical system of the recreational vehicle (which may be from the vehicle proper or from a separate generator) is tied into the cable connection block 66. The tankless water heater for a recreational vehicle 10 is ready for operation.

The electronic control card 68 continually monitors the signal from the water flow meter 58. When the water flowing through the water flow meter 58 exceeds a certain threshold (e.g., 1/2 gallon per minute of water flow), indicating demand for hot water, the electronic control card 68 energizes the first water heating element 62 and the second water heating element 64, through the primary thermostat 76 and the secondary thermostat 78, respectively. If the user has selected a particular amount of power supplied 34 within the power range 28, then the TRIACs adjust the firing angle of the alternating current flowing to the first water heating element 62 and to the second water heating element 64 to thereby adjust the amount of electric power being supplied to the heating elements 62 and 64. If the user has selected a particular temperature 32 within the temperature range 26, then the electronic control card 68 monitors the signal sent by the output temperature sensor 80 and compares the reading against the selected particular temperature 32 selected. If the temperature sensed by the output temperature sensor 80 does not match the particular temperature 32 selected, the electronic control card 68 sends a signal to the TRIACs 82 in order for the TRIACs 82 to adjust the firing angle of the alternating current flowing to the first water heating element 62 and to the second water heating element 64, the particular change depending on whether the sensed temperature by the output temperature sensor 80 is too high (less electric power) or too low (more electric power) compared to the particular temperature 32 selected and in an amount of change depending on the delta between sensed temperature by the output temperature sensor 80 and the particular temperature 32 selected. The electronic control card 68 continually monitors these inputs and makes adjustments to the TRIACs 82 as necessary.

At all times, irrespective of the mode in which the tankless water heater for a recreational vehicle (temperature range 26 or power range 28), the electronic control card 68 monitors the temperature sensed by the output temperature sensor 80 and if the sensed temperature exceeds a threshold amount that is too high for the system to handle, the electronic control card 68 sends a signal to the emergency shutoff 72, tripping the electrical circuit of the system and shutting the system down. The electronic control board 68 also signals the emergency shutoff 72 to trip the electrical circuit if other abnormalities are detected by the electronic control card 68 such as loss of signal from one of the elements. As seen, the emergency shutoff 72 can also be triggered via the reset button 74 located thereon, which is accessible through the rest button access opening 24 so that a user can press the reset button 74 to trip the electrical circuit. A second pushing of the reset button 74 resets the circuit breaker and allows the tankless water heater for a recreational vehicle 10 to once again operate.

While the invention has been particularly shown and described with reference to an embodiment thereof, it will be appreciated by those skilled in the art that various changes in form and detail may be made without departing from the spirit and scope of the invention.

We claim:

1. An on-demand water heater for a vehicle, the tankless water heater comprising:
    a tank having an inlet line with an inlet port adapted to be connected to a source of water, the tank also having an outlet line with an outlet port, the outlet line having a heat sensor disposed therein for sensing a water temperature of the water flowing therethrough;
    a heating element having a thermostat, the thermostat connected to a source of alternating current, such that the alternating current passes through a three-terminal semiconductor device (TRIAC) that adjusts the firing angle of the alternating current passing therethrough in order to control an amount of power of the alternating current that flows to the thermostat, the heating element disposed within the tank; and
    a control panel in signal communication with the temperature sensor and the TRIAC such that the control panel has a temperature value setting corresponding to a desired temperature and a power value setting corresponding to a percentage of desired amount of power, the control panel also has a toggle switch for selecting either the temperature value or the power value so that if the temperature value is selected, the control panel receives the water temperature sensed by the heat sensor and compares the water temperature to the desired temperature and if the two are not equal, the control panel sends a signal to the TRIAC to either increase the amount of power flowing to the thermostat if the water temperature is below the desired temperature, or to decrease the amount of power flowing to the thermostat if the water temperature is above the desired temperature and if the power value is selected, the control panel sends a signal to the TRIAC to adjust the amount of power flowing to the thermostat to match the power value.

2. The on-demand water heater for a vehicle as in claim 1 wherein the temperature value is adjustable.

3. The on-demand water heater for a vehicle as in claim 2 wherein the power value is adjustable.

4. The on-demand water heater for a vehicle as in claim 1 wherein the power value is adjustable.

5. The on-demand water heater for a vehicle as in claim 1 further comprising an on/off switch located along a path of the alternating current for turning the flow of the alternating current between the source and the thermostat on or off.

6. The on-demand water heater for a vehicle as in claim 1 wherein the on/off switch is a flow meter that senses a fluid flow rate, the flow meter disposed within the inlet line such that the on/off switch is off unless the fluid flow rate sensed by the flow meter exceeds a threshold value.

7. The on-demand water heater for a vehicle as in claim 1 further comprising a circuit breaker located along a path of the alternating current for interrupting the flow of the alternating current between the source and the thermostat.

8. The on-demand water heater for a vehicle as in claim 1 wherein the circuit breaker is connected to the control panel such that if the water temperature sensed by the heat sensor exceeds a threshold value, the circuit breaker trips and interrupts the flow of alternating current to the thermostat.

9. The on-demand water heater for a vehicle as in claim 8 wherein the circuit breaker has a manual trip button for tripping the circuit breaker.

* * * * *